Jan. 20, 1925.
F. W. SPERR, JR
1,523,845
RECOVERY OF HYDROGEN SULPHIDE
Original Filed Dec. 8, 1921
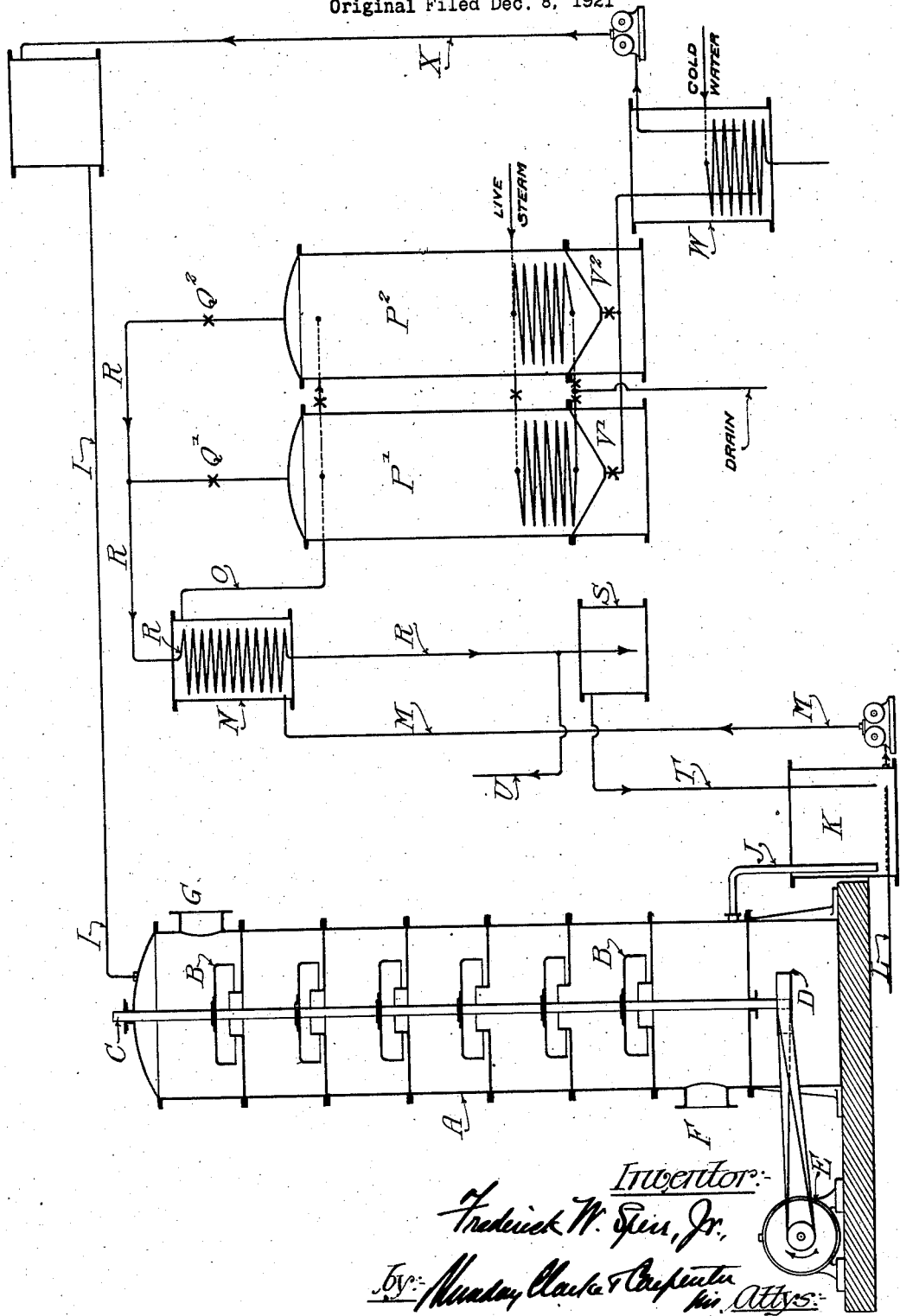
Inventor:-
Frederick W. Sperr, Jr.
By: Munday Clarke & Carpenter
his Attys.

UNITED STATES PATENT OFFICE.

FREDERICK W. SPERR, JR., OF PITTSBURGH, PENNSYLVANIA, ASSIGNOR TO THE KOPPERS COMPANY, OF PITTSBURGH, PENNSYLVANIA, A CORPORATION OF PENNSYLVANIA.

RECOVERY OF HYDROGEN SULPHIDE.

Application filed December 8, 1921, Serial No. 520,809. Renewed June 5, 1924.

*To all whom it may concern:*

Be it known that I, FREDERICK W. SPERR, Jr., a citizen of the United States, residing in Pittsburgh, in the county of Allegheny and State of Pennsylvania, have invented a new and useful Improvement in the Recovery of Hydrogen Sulphide, of which the following is a specification.

This invention relates to the manufacture of hydrogen sulphide and has for an object to produce concentrated or substantially pure hydrogen sulphide from gases which contain it. The process of the invention is especially applicable to the treatment of gases which contain but moderate amounts of carbon dioxide in proportion to the hydrogen sulphide content. A typical example of such gases is the gas produced in the distillation and cracking of petroleum as this gas may contain five percent or more of hydrogen sulphide by volume, but very little or no carbon dioxide. The process is, however, also applicable to the treatment of other gases, such as coke oven gas, produced or treated in such a manner as to have a relatively moderate content of carbon dioxide. It is the purpose of the invention to treat gases, such as those above mentioned, in such a way as to remove part or all of the hydrogen sulphide content and to recover the thus removed hydrogen sulphide in a concentrated form, so that it may be employed for any desired purpose, for example, for the manufacture of sulphuric acid.

In addition to the general objects recited above, the invention has for further objects such other improvements or advantages in operation or results as are found to obtain in the apparatus and processes hereinafter described or claimed.

In the accompanying drawing, forming a part of this specification and showing, for purposes of exemplification, a preferred form and manner in which the invention may be embodied and practiced, but without limiting the claimed invention specifically to such illustrative instance:

The figure illustrate a diagrammatic representation of apparatus for carrying out the improved process of the present invention.

In carrying out the invention, there is employed a suspension of magnesium hydroxide $(Mg(OH)_2)$, magnesium oxide (MgO) or magnesium carbonate $(MgCO_3)$ as examples of material suitable for carrying out the process.

The process is of especial advantage in application to gases low in carbon dioxide, but is not necessarily limited to such gases. In fact, it is well suited to the treatment of gases containing moderate amounts of carbon dioxide. The carbon dioxide acts upon the magnesium hydroxide or sulphide forming magnesium carbonate which is capable of reacting with hydrogen sulphide to some extent and therefore assists in the absorption of the hydrogen sulphide from the gas.

Magnesium hydroxide readily forms suspensions which react readily with hydrogen sulphide. If a magnesium hydroxide suspension be brought into contact with gas containing hydrogen sulphide, the following reaction occurs:

$$Mg(OH)_2 + 2H_2S \rightarrow Mg(SH)_2 + 2H_2O$$

The reaction continues to the point at which the vapor pressure of hydrogen sulphide from the magnesium hydrosulphide solution is equal to the partial pressure of the hydrogen sulphide in the gas.

The vapor pressure of hydrogen sulphide over a solution of magnesium hydrosulphide is due to two reactions, namely:

$$Mg(HS)_2 + 2H_2O \rightarrow Mg(OH)_2 + 2H_2S$$
$$Mg(HS)_2 \rightarrow MgS + H_2S$$

In the presence of water, however, the magnesium sulphide readily reacts as follows:

$$2MgS + 2H_2O \rightarrow Mg(HS)_2 + Mg(OH)_2$$

From the above it will be seen that the reaction between magnesium hydrosulphide and water is the major reaction.

At ordinary temperatures (15 degrees to 24 degrees C.) the concentration of magnesium hydrosulphide is considerable before the vapor pressure of hydrogen sulphide attains any magnitude; therefore, a suspension of magnesium hydroxide, i. e., magnesium oxide in water, is a good absorbent for hydrogen sulphide in gas. As the temperature is increased, however, the vapor pressure of the hydrogen sulphide for any concentration of the magnesium hydrosulphide rapidly increases, until, at boiling temperature, the reaction of magnesium hydrosulphide with water, to magnesium hydroxide and hydrogen sulphide, proceeds quickly to practical completion. Hence, a suspension of magnesium hydroxide or magnesium oxide in water, fouled by absorbing hydrogen sulphide from gas, may be readily regenerated or actified by heating.

Most gases containing hydrogen sulphide, such as coal gas, water gas and the like, also contain carbon dioxide. Concurrently with the absorption of the hydrogen sulphide by the magnesium hydroxide or magnesium oxide in suspension, the following reaction will proceed, whenever there is an excess of magnesium hydroxide in the solution:

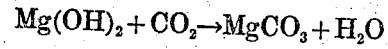
$$Mg(OH)_2 + CO_2 \rightarrow MgCO_3 + H_2O$$

The magnesium carbonate thus formed possesses an appreciable solubility and reacts with the hydrogen sulphide in the gas as follows:

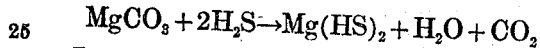
$$MgCO_3 + 2H_2S \rightarrow Mg(HS)_2 + H_2O + CO_2$$

In accordance with the invention, there is thus developed a continuous cyclic process for the removal of hydrogen sulphide from gas, with recovery of the hydrogen sulphide in concentrated form. In carrying out such a process, the gas may be treated with magnesium hydroxide, or a water suspension of magnesium oxide. The suspension containing the absorbed hydrogen sulphide may then be heated to cause it to give up all hydrogen sulphide and to regenerate the suspension for further absorption of hydrogen sulphide. After heating, the regenerated suspension is cooled and recirculated to bring it again in contact with the hydrogen sulphide bearing gas. Any loss of material, whether mechanically or through secondary reactions, may be made up by adding to the system either magnesium hydroxide, magnesium sulphide or both.

The accompanying drawing illustrates diagrammatically one arrangement of apparatus for carrying out the process, although it will be understood that many modifications of apparatus and many other arrangements of apparatus may be employed. The gas containing hydrogen sulphide may be treated in a rotary gas scrubber A which is especially adapted for the treatment of gas with suspensions or emulsions. A scrubber of this type embodies a casing divided into compartments by trays having central openings, with rotating bells B in each compartment which are attached to the shaft C, the latter being driven through the power connection D by the motor E. The gas containing hydrogen sulphide enters the bottom of the scrubber through the pipe F and passes through the different compartments in countercurrent to the suspension, and emerges through the pipe G. The suspension (such as a water suspension of magnesium oxide or magnesium hydroxide), is drawn from the supply tank H through the pipe line I and discharges into the top compartment of the scrubber. Suspensions of different strengths may be employed; a satisfactory suspension, however, is five parts by weight of magnesium hydroxide to a hundred parts by weight of water. The suspension containing the absorbed hydrogen sulphide flows out of the scrubber through the pipe J into the tank K. Here it is kept in agitation by air or by steam blown through the pipe L. From the tank K, the suspension is pumped through the line M into the preheater N where it is heated by the steam and gases from the evaporators. The preheated suspension then flows through the line O into one of the two evaporators P' and P². These may be of the continuous or intermittent type. Intermittent operation will be described here.

The suspension is pumped into the evaporator P' until this is full and then into P². The first evaporator is heated to the boiling point and hydrogen sulphide is rapidly evolved, passing through the pipe Q' into the line R which is connected with a coil in the preheater N. The cooling effect of the preheater may be supplemented by a condenser in which the vapors are further cooled by fresh air. The steam is condensed and the condensate, carrying a little hydrogen sulphide, runs into the tank S, from which the condensate may be returned through the line T to the tank K. The bulk of hydrogen sulphide passes out through the line U and may be utilized as desired, e. g., for the manufacture of sulphuric acid or sulphur.

When the contents of the evaporator P' have been sufficiently heated so that all of the magnesium hydro-sulphide is decomposed to form magnesium hydroxide, the heating is discontinued and the valve in the line Q' is closed. Valve V' is opened and the contents of the evaporator are allowed to drain into the cooling tank W, provided with cooling coils through which water is circulated. The contents of this tank are preferably kept in agitation by air or by mechanical means. In other arrangements, the hot suspension from the evaporator may be used to assist in preheating the suspension going to the evaporators.

In the meantime, evaporator P² will be filled and heated, the hydrogen sulphide and steam passing out through the line Q². The operations of filling, heating and emptying are conducted alternately in the two evaporators. It is advantageous to employ vacuum in the operation of heating since the removal of hydrogen sulphide is greatly facilitated thereby. Steam directly injected into the contents of the evaporator also assists in accelerating the reactions. The expulsion of hydrogen sulphide from the suspension during the heating may also be facilitated by passing air or other gases through the suspension in the heating apparatus.

From the cooling tank W, the suspension is pumped through the line X to the tank H from which it is circulated again over the gas in the scrubber A.

The employment of magnesium compounds, such as magnesium hydroxide, possesses the following advantages: The absorbent capacity of magnesium hydroxide is 1.25 that of calcium hydroxide, per unit weight. The decomposition of magnesium hydrosulphide is effected very readily and completely. When formed, magnesium carbonate possesses a degree of solubility which renders it capable of reacting with hydrogen sulphide, with the result that any magnesium carbonate formed may assist the magnesium hydroxide in the absorption of the hydrogen sulphide. Magnesium carbonate in suspension, when heated, undergoes transformation into a basic carbonate of varying composition, thereby rendering it a good absorbent for hydrogen sulphide. If desired, a suspension of magnesium carbonate may be employed in place of the suspension of magnesium oxide or magnesium hydroxide. According to the above description, the regeneration of the fouled suspension is effected by heating. If desired, however, the regeneration may be effected by passing air through the fouled suspension. Although regeneration or actification by air is slower than that attained by heating, air actification will remove the hydrogen sulphide from the fouled suspension.

The invention as hereinabove set forth may be variously embodied within the scope of the claims hereinafter made.

I claim:

1. The process of producing hydrogen sulphide, which consists in: passing a hydrogen sulphide bearing gas into contact with a suspension of magnesium hydroxide to absorb the hydrogen sulphide from the gas; then subjecting the suspension containing the absorbed hydrogen sulphide to a preheating operation; then heating the preheated suspension to expel the hydrogen sulphide and to regenerate the suspension; the liberated vapors being employed for preheating the suspension going to the heating operation; and cooling the regenerated suspension and passing it back to the gas treatment stage; substantially as specified.

2. The process of producing hydrogen sulphide, which consists in: passing a hydrogen sulphide bearing gas into contact with a suspension of a magnesium compound having an affinity for hydrogen sulphide to absorb the hydrogen sulphide from the gas; then subjecting the suspension containing the absorbed hydrogen sulphide to a preheating operation; then heating the preheated suspension to expel the hydrogen sulphide and to regenerate the suspension; the liberated vapors being employed for preheating the suspension going to the heating operation; and cooling the regenerated suspension and passing it back to the gas treatment stage; substantially as specified.

3. The process of producing hydrogen sulphide which consists in: passing a hydrogen sulphide bearing gas into contact with a suspension of magnesium hydroxide to absorb the hydrogen sulphide from the gas; and then subjecting the suspension containing the absorbed hydrogen sulphide to a heating operation to liberate the hydrogen sulphide and to regenerate the suspension for further absorption of hydrogen sulphide from gases; substantially as specified.

4. The process of producing hydrogen sulphide which consists in: passing a hydrogen sulphide bearing gas into contact with a suspension of a magnesium compound having an affinity for sulphur to absorb the hydrogen sulphide from the gas; and then subjecting the suspension containing the absorbed hydrogen sulphide to a heating operation to liberate the hydrogen sulphide and to regenerate the suspension for further absorption of hydrogen sulphide from gases; substantially as specified.

In testimony whereof I have hereunto set my hand.

FREDERICK W. SPERR, Jr.